Figure 1:
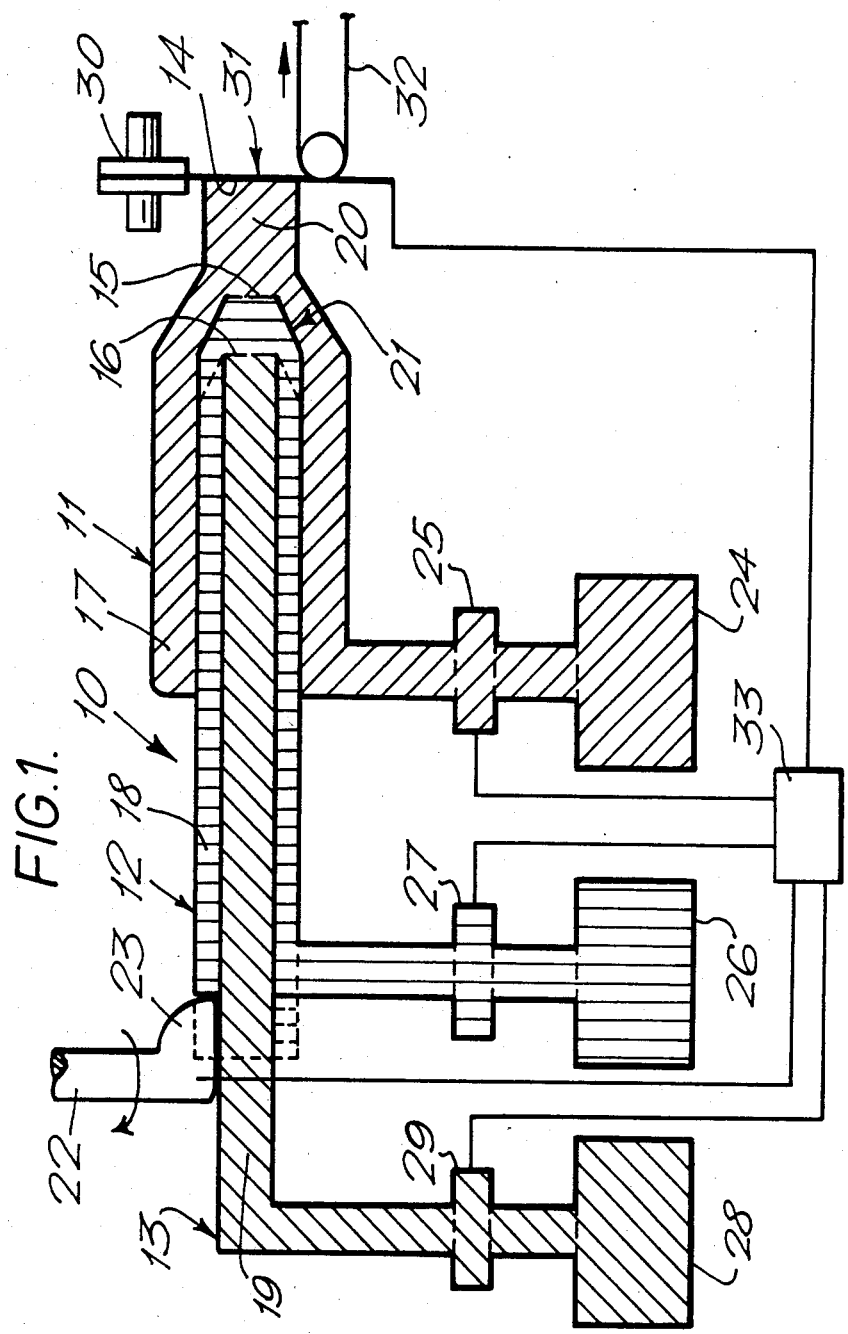

United States Patent [19]

Svengren

[11] Patent Number: 4,659,580
[45] Date of Patent: Apr. 21, 1987

[54] METHOD AND APPARATUS FOR EXTRUDING AND CUTTING A FOOD MATERIAL

[75] Inventor: Anders G. Svengren, Hjaernarp, Sweden

[73] Assignee: Nestec S.A., Vevey, Switzerland

[21] Appl. No.: 745,600

[22] Filed: Jun. 17, 1985

[30] Foreign Application Priority Data

Jul. 30, 1984 [EP] European Pat. Off. ........ 84109002.0

[51] Int. Cl.$^4$ .......................... B29C 47/06; A21C 3/04
[52] U.S. Cl. .................................. 426/516; 99/450.1;
99/450.7; 264/40.7; 264/171; 264/245;
425/132; 425/133.1; 425/142; 425/145;
425/164; 425/166
[58] Field of Search ................... 99/450.6, 450.7, 426,
99/450, 450.1; 425/133.1, 114, 142, 145, 164,
166, 168; 426/502, 512, 513, 516, 272, 274, 275;
264/245, 246, 171, 172, 141, 40.7

[56] References Cited

U.S. PATENT DOCUMENTS

| | | | |
|---|---|---|---|
| 3,778,209 | 12/1973 | Wallace et al. | 425/133.1 |
| 4,343,603 | 8/1982 | Pavlov et al. | 425/114 |
| 4,469,475 | 9/1984 | Krysiak | 425/133.1 |
| 4,486,163 | 12/1984 | Pfeilstetter | 425/133.1 |
| 4,492,542 | 1/1985 | Rasmussen | 425/133.1 |
| 4,548,569 | 10/1985 | Pitigliano et al. | 425/133.1 |
| 4,569,101 | 2/1986 | Tribbett | 425/133.1 |

*Primary Examiner*—Willard E. Hoag
*Attorney, Agent, or Firm*—Vogt & O'Donnell

[57] ABSTRACT

Method and apparatus for manufacturing a food product in which an edible filling material is completely enclosed in an edible coating material, comprising outer, intermediate and inner spaced apart concentrically arranged extrusion conduits; means for extruding the coating material continuously through the channel between the outer and intermediate conduits to form a tube of coating; means for extruding the filling material intermittently through the channel between the intermediate and inner conduits so that it forms a filling within the tube of coating; means for mechanically isolating the filling material, on interruption of extrusion, from the filling within the tube of coating; means for extruding further coating material alternately to the extrusion of the filling material, through the inner conduit so that it flows within the tube of coating at the rear end of the filling; and means for cutting the extruded tube cross-sectionally between positions where filling is located.

13 Claims, 3 Drawing Figures

METHOD AND APPARATUS FOR EXTRUDING AND CUTTING A FOOD MATERIAL

The present invention relates to a machine for manufacturing a food product in which an edible filling is completely enclosed in an edible coating, more particularly to a solid food product in which both the filling material and the coating material are in extrudable and pumpable form.

In the processing of certain filled food products which require a subsequent cooking operation it is imperative that the filling is totally insulated inside the coating to prevent leakage of the filling into the cooking medium.

Several devices are known for preparing food products having a central filling completely enclosed in an outer coating and such devices usually comprise two tubes concentrically arranged so that the filling material is extruded through the centre tube and the coating material is extruded through the outer tube. One example is described in U.S. Pat. No. 3,778,209 wherein means are provided for intermittently stopping the flow of the filling material in such a manner that uniform, intermittent extrusion is maintained and for slicing the continuously extruded coating material between portions of the intermittently extruded filling material such that the resulting food product has a filling totally enveloped within the coating material. Another example is described in U.S. Pat. No. 4,251,201 wherein the inner tube is not linearly coextensive with the outer tube and terminates at a selected distance from the terminal portion of the outer tube adjacent to which is disposed an iris valve element. In operation, simultaneously with the commencement of extrusion of both filling and coating materials, the iris valve begins to open and allows the passage of the product through the aperture. The iris valve gradually opens fully and then begins to close at which time the extrusion of the filling material is gradually discontinued and as the iris valve continues to close, the continuous movement of the coating material pulls away the filling within the product from the trailing mass of filling material. On closure of the iris valve the extrusion of the coating material is discontinued and the shaped food product is separated with the filling completely surrounded by the coating material.

However, if the food product is prepared from a filling material with a consistency thicker than that of the coating material, when the flow of the filling material in the extrusion tube to the centre of the extruded coating material is interrupted, the flow of the filling in the centre of the product stops also and does not follow the flow of the coating material. The result is that there is a continuously pulsating strand of filling along the whole length of the tubular extruded product and thus wherever the product is cut or separated, the filling will be exposed at the ends and will not be completely enclosed by the coating material. This problem is enhanced if the filling material is sticky because the filling will tend to stick to the end of the filling tube. In order to overcome this problem it is essential to have a substantially even flow of the extruded material over the entire cross section of the product being extruded even when the extrusion of the filling material is interrupted, and an object of the present invention is to guarantee this whatever the consistencies of the materials being extruded.

Accordingly, the present invention provides a machine for manufacturing a food product in which an edible filling material is completely enclosed in an edible coating material, comprising outer, intermediate and inner spaced apart concentrically arranged extrusion conduits;

means for extruding the coating material continuously through the channel between the outer and intermediate conduits to form a tube of coating;

means for extruding the filling material intermittently through the channel between the intermediate and inner conduits so that it forms a filling within the tube of coating;

means for mechanically isolating the filling material, on interruption of extrusion, from the filling within the tube of coating;

means for extruding further coating material alternately to the extrusion of the filling material, through the inner conduit so that it flows within the tube of coating at the rear end of the filling; and means for cutting the extruded tube cross-sectionally between positions where filling is located.

Food products especially suitable for manufacture by this machine are those in which the filling has a consistency thicker than that of the coating material, for instance, meat balls with a cheese filling. The coating of meat may if desired by extruded from force meat. The machine is suitable for making products of an size.

The coating and filling materials may be supplied to the extrusion conduits by any suitable conventional means, for example, by hoppers from which they may be fed by any conventional feed mechanism e.g. a pump or a Handtmann filler.

The outer conduit is conveniently fixed and preferably its outlet end terminates beyond the outlet ends of the intermediate and inner conduits to form a common extrusion nozzle. Preferably either the intermediate or inner conduit is adapted to reciprocate, for example by means of a cam mechanism.

The means for mechanically isolating the filling material, on interruption of extrusion, from the filling within the tube of coating may suitably be provided by the intermediate conduit having an annular skirt projecting internally, the internal edge of the skirt forming the outlet end of the intermediate conduit and capable of contacting the wall of the inner conduit and either the intermediate conduit or the inner conduit being adapted to reciprocate so that filling material is extruded when the outlet end of the intermediate conduit is positioned beyond the outlet end of the inner conduit, and the filling material is isolated when the internal edge of the skirt of the intermediate conduit contacts the wall of the inner conduit.

The extrusion materials preferably travel at substantially the same speed and advantageously, immediately after the interruption of the extrusion of the filling material, further coating material is extruded to contact the rear end of the filling material and form a plug of coating material.

Any suitable cutting device may be used and one convenient device is a rotary knife. All the movements of the machine are preferably synchronised e.g by conventional methods.

After cutting, the products may, if desired, be treated by a rounding or rolling device to impart a rounded shape.

The machine may have a plurality of extrusion units in a row to increase the capacity.

The extrusion conduits of the machine may be constructed from materials which are suitable for handling foodstuffs, for example, stainless steel.

Figure 2:
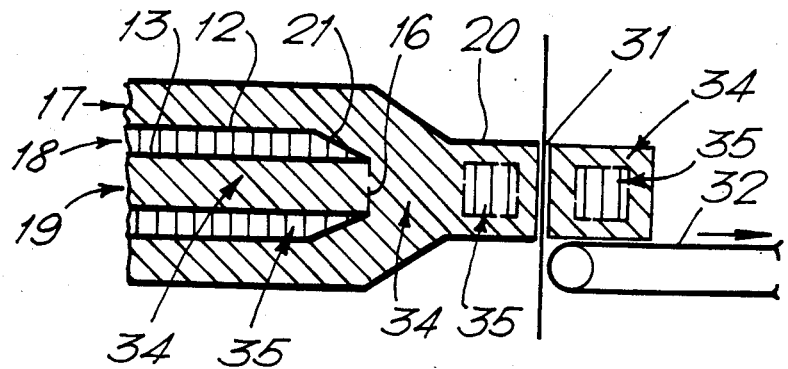
Figure 3:
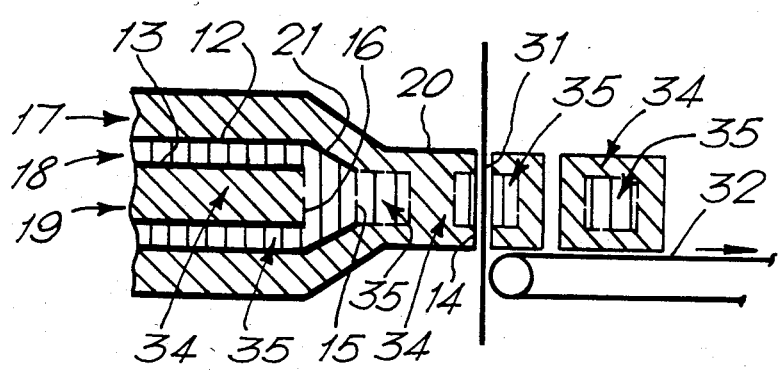

The present invention is further illustrated by way of example with reference to the accompanying drawings in which:

FIG. 1 is a schematic side elevational view partly in cross-section of the machine of the invention and FIGS. 2 and 3 are cross-sectional side views of the outlet ends of the conduits showing the sequence of operations for making the filled product.

Referring to FIG. 1, the machine 10 comprises concentrically arranged conduits 11, 12, 13 with outlets 14, 15, 16 respectively, of circular cross-section defining channels 17, 18, 19. The outer conduit 11 extends beyond the outlet ends of conduit 12 and intermediate inner conduit 13 to form a common extrusion nozzle 20. The conduit 12 is provided with an annular skirt 21 the inner edge of which forms outlet 15. The conduit 12 is adapted to reciprocate backwards and forwards by means of a rotating shaft 22 with an eccentric cammed end 23 abutting against its rear end, while it is spring biased towards the backward position: it is shown in its forward position in FIG. 1, the dashed lines representing its backward position. A hopper 24 contains ground meat for continuous supply to the channel 17 by means of a feed mechanism 25 which is conveniently a mono pump. A hopper 26 contains cheese for intermittent supply to channel 18 by means of a Handtmann sausage filler 27. A hopper 28 contains further ground meat for intermittent supply by means of a feed mechanism consisting of a rotary valve 29. At the outlet 14 of the common extrusion nozzle 20 is a rotary knife 30 fitted with a cutting pin 31 followed by a conveyor belt 32. A synchroniser 33 coordinates the operations of the feed mechanisms 25, 27 and 29, the reciprocating conduit 12 and the rotary knife 30.

The operation of the machine is illustrated in FIGS. 2 and 3, in which, for descriptive purposes, the commencement of the cycle is shown in FIG. 2 where a filled meat product consisting of a coating of meat 34 and a cheese filling 35 just cut by the pin 31 of rotary knife 30 is being transported away on the conveyor belt 32. Flowing through the extrusion nozzle 20 further cheese filling 35 is completely enclosed in the meat coating 34 which is flowing through channels 17 and 19, the conduit 12 is in its backward position while the flow of cheese filling 35 contained within channel 18 has stopped by closure of the Handtmann filler 27 (see FIG. 1) and is completely cut off from the extrusion nozzle 20 by means of the annular skirt 21 contacting the wall of the inner conduit 13.

When sufficient meat coating has been extruded through the outlet 16 of channel 19 the synchroniser 33 coordinates the closure of the rotary valve 29 (see FIG. 1), the opening of the Handtmann filler 27 and the simultaneous operation of the cam mechanism to effect the movement of the conduit 12 to its forward position as shown in FIG. 3, so that the flow of meat coating from channel 19 ceases and cheese filling 35 commences to be extruded through the outlet 15 of channel 18, within and at the same speed as, the tube of meat being extruded continuously through channel 17 into the extrusion nozzle 20. The cheese filling 35 already completely enclosed in the meat coating 34 is shown passing through the outlet 14 of the common extrusion nozzle 20.

When sufficient cheese filling 35 has been extruded through the outlet 15 of channel 18, the synchroniser 33 coordinates the closure of the filler 27, the opening of the rotary valve 29 and the simultaneous operation of the cam mechanism to effect the movement of the conduit 12 to its backward position, as shown in FIG. 2, so that the flow of cheese filling 35 from the channel 18 ceases and the ground meat coating 34 commences to be extruded through the outlet 16 of channel 19 immediately behind cheese filling 35 within and at the same speed as the tube of meat being extruded continuously through channel 17 into the extrusion nozzle 20, so that it plugs the rear end of the cheese filling and completely encloses it with meat coating. The cheese filling 35 enclosed in the meat coating 34 has now passed through the outlet 14 and the extruded meat strand is cut by the pin 31 of the rotary knife 30 through the meat coating at a position half-way between the successive portions of cheese filling. The longitudinal positioning of the rotary knife 30 is adjustable so that, at the moment of cutting, the extruded meat strand can be cut exactly where desired. After being transported away on the conveyor belt 32 the filled meat product is passed to a rounding machine to be formed into a meat ball which is fried prior to freezing.

I claim:

1. A process for manufacturing a product in which a filling material is completely enclosed in a coating material, comprising:
   (a) continuously extruding the coating material;
   (b) extruding the filling material intermittently such that it flows within and is surrounded by the continuously extruded coating material; and
   (c) extruding further coating material alternately intermittently with respect to the extrusion of the filling material such that the further coating material flows within the continuously extruded coating material after extrusion of the filling material to form a plug of coating material at the rear end of the filling material.

2. The process of claim 1 further comprising cutting the extruded product such that only coating material is cut cross-sectionally between positions where filling material is located.

3. The process of claim 1 wherein the filling material has a consistency thicker than that of the coating material.

4. The process of claim 1 wherein the filling and coating materials are extruded at substantially the same speed.

5. The process of claim 1 wherein the product is extruded via a common extrusion nozzle which receives the continuously extruded coating material extruded via an outer conduit channel, the filling material extruded via an intermediate conduit channel, concentrically arranged within the outer conduit channel, and the further coating material extruded via an inner conduit channel, concentrically arranged within the intermediate and outer conduit channels.

6. A machine comprising:
   (a) an inner extrusion conduit channel;
   (b) an intermediate extrusion conduit channel concentrically arranged about the inner conduit channel;
   (c) an outer extrusion conduit channel, concentrically arranged about the intermediate and inner conduit channels;
   (d) a common extrusion nozzle for the outer, intermediate and inner conduit channels;

(e) means for continuously extruding a coating material through the outer conduit channel to and through the extrusion nozzle; and (f) means for alternately extruding and interrupting the flow of each of a filling material and of further coating material via the intermediate and inner conduit channels, respectively, such that filling material extruded by the intermediate conduit channel flows within and is surrounded by the continuous flow of coating material extruded by the outer conduit and such that the further coating material extruded by the inner conduit channel flows within the continuous flow of coating material after extrusion of the filling material to form a plug of coating at the rear end of each portion of the extruded filling material.

7. A machine according to claim 6 wherein the intermediate conduit channel is adapted to reciprocate.

8. A machine according to claim 6 wherein the outlet end of the outer conduit channel terminates beyond the outlet ends of the intermediate and inner conduit channels to form the common extrusion nozzle.

9. A machine according to claim 6 wherein the means for interrupting extrusion of the filling material is an annular skirt, the internal edge of the skirt forming the outlet end of and projecting internally in the intermediate conduit channel which is adapted to reciprocate, the skirt being capable of contacting the wall of the inner conduit channel such that filling material is extruded when the outlet end of the intermediate conduit channel is positioned beyond the outlet end of the inner conduit channel and such that further coating material is extruded when the internal edge of the skirt contacts the wall of the inner conduit channel.

10. The machine of claim 6 further comprising means for cutting the extruded product cross-sectionally such that only the coating material is cut between positions where filling material is located.

11. A machine according to claim 6 wherein the inner conduit channel is adapted to reciprocate.

12. A machine according to claim 6 wherein the means for interrupting extrusion of the filling material is an annular skirt, the internal edge of the skirt forming the outlet end of the intermediate conduit channel, the skirt being capable of contacting the wall of the inner conduit channel which is adapted to reciprocate such that filling material is extruded when the outlet end of the intermediate conduit channel is positioned beyond the outlet end of the inner conduit channel and such that further coating material is extruded when the internal edge of the skirt of the intermediate conduit channel contacts the wall of the inner conduit channel.

13. A machine according to claim 6 further comprising means to feed said filling and coating materials to the extrusion means and means to synchronize the extrusion of the materials such that they are extruded at substantially the same speed.

* * * * *